(12) United States Patent
Tateno et al.

(10) Patent No.: US 7,664,953 B2
(45) Date of Patent: Feb. 16, 2010

(54) DATA PROCESSING DEVICE, METHOD OF SAME, AND PROGRAM OF SAME

(75) Inventors: Kei Tateno, Tokyo (JP); Masahiro Sueyoshi, Kanagawa (JP); Yoshiaki Hirano, Kanagawa (JP); Katsuyuki Teruyama, Tokyo (JP)

(73) Assignee: Sony Corporation, Tokyo (JP)

( * ) Notice: Subject to any disclaimer, the term of this patent is extended or adjusted under 35 U.S.C. 154(b) by 672 days.

(21) Appl. No.: 10/792,574

(22) Filed: Mar. 4, 2004

(65) Prior Publication Data

US 2004/0247118 A1 Dec. 9, 2004

(30) Foreign Application Priority Data

Mar. 6, 2003 (JP) .............................. 2003-059793

(51) Int. Cl.
*H04L 9/32* (2006.01)
(52) U.S. Cl. ......................................... 713/169; 380/44
(58) Field of Classification Search .................. 380/44; 713/169
See application file for complete search history.

(56) References Cited

U.S. PATENT DOCUMENTS

| | | | | |
|---|---|---|---|---|
| 6,915,434 B1 * | 7/2005 | Kuroda et al. | ............... | 713/193 |
| 7,010,688 B1 * | 3/2006 | Kawasaki | ................... | 713/168 |
| 2002/0094088 A1 * | 7/2002 | Okaue | ......................... | 380/278 |
| 2002/0111133 A1 * | 8/2002 | Wittkotter | ....................... | 455/1 |
| 2002/0152387 A1 * | 10/2002 | Asano | ......................... | 713/176 |

FOREIGN PATENT DOCUMENTS

| | | |
|---|---|---|
| JP | 9-319845 | 12/1997 |
| JP | 2003-141460 | * 5/2003 |

OTHER PUBLICATIONS

U.S. Appl. No. 10/792,574, filed Mar. 4, 2004, Tateno et al.
U.S. Appl. No. 10/791,760, filed Mar. 4, 2004, Sueyoshi et al.
"Computer Security Symposium 2000 (CSS 2000)", Information Processing Processing Society of Japan Symposium Series, vol. 2000, No. 12, Oct. 26, 2000, 8 Pages.

* cited by examiner

*Primary Examiner*—Gilberto Barron, Jr.
*Assistant Examiner*—Cordelia Kane
(74) *Attorney, Agent, or Firm*—Oblon, Spivak, McClelland, Maier & Neustadt, L.L.P.

(57) ABSTRACT

A data processing device, in a system performing authentication among a plurality of storage device (IC cards etc.), able to maintain security of authentication at other device even when secrecy of key data held by part of the devices is lost, wherein a key generation unit generates individual key data unique to an IC card based on identification data unique to the IC cards received from the ICs of the IC cards and a card processing unit performs mutual authentication with the IC based on the individual key data.

6 Claims, 11 Drawing Sheets

KMD: KEY MANAGEMENT DATA
KP: KEY PACKAGE

DATA PROCESSING DEVICE, METHOD OF SAME, AND PROGRAM OF SAME

BACKGROUND OF THE INVENTION

1. Field of the Invention

The present invention relates to a data processing device for authentication with a service data storing device by using key data and a method and program of the same.

2. Description of the Related Art

For example, when providing various services using an integrated circuit (IC) card etc., there is a system of the IC card and the authenticating device holding common key data and using the key data for authentication. Such a system stores key data common to a plurality of IC cards for the plurality of IC cards issued by a service provider.

In the above system, therefore, there is a problem that when part of IC cards lost secrecy of the key data stored in the IC cards, security no longer could be maintained for all of the IC cards. Further, as a countermeasure for this, it becomes necessary to replace the key data leaked to the outside by a new key data, but there has the problem of being troublesome.

SUMMARY OF THE INVENTION

An object of the present invention is to provide a data processing device, in a system performing authentication based on key data among a plurality of the device to be authenticated (IC cards), able to maintain the security of authentication at other devices even if the secrecy of the key data kept by part of the devices were lost, and a method and program of the same.

To attain the above object, according to a first aspect of the invention, there is provided a data processing device comprising a key generating means for generating individual key data unique to corresponding devices to be authenticated based on individual data unique to each device and an authenticating means for performing authentication with a corresponding device based on the individual key data generated by the key generating means.

The mode of operation of the data processing device of the first aspect of the invention is as follows: The key generating means generates individual key data unique to devices to be authenticated based on individual data unique to the device received from the device. Next, the authenticating means authentication with the device based on the individual key data generated by the key generating means.

Preferably, the key generating means selects a key generation algorithm corresponding to a designated processing content among a plurality of key generation algorithms defined corresponding to a plurality of processing contents to be performed after the authentication and generates the individual key data unique to the device based on the selected key generation algorithm. Further, the data processor preferably further has a key managing means for holding fixed key data common to the plurality of devices, and the authenticating means performs first authentication performed using the fixed key data and second authentication performed using second the individual key data.

According to a second aspect of the invention, there is provided a data processing device, comprising an authenticating means confirming legitimacy of device by authentication, then performing processing linked with the device; a key managing means for holding fixed key data common to a plurality of device and providing fixed key data corresponding to a first request from a device to the authenticating means; and a key generating means for generating individual key data unique to devices based on individual data unique to the devices in accordance with a second request from the key managing means and providing the individual key data to the key managing means, wherein the key managing means provides the held fixed key data to the authenticating means when the fixed key data is corresponded to the first request and outputs the fixed data received from the device to the key generating means corresponding to the second request and provides the individual key data generated at the key generating means to the authenticating means when the individual key data is corresponded to the first request, and the authenticating means performs the authentication based on the fixed key data or the individual key data received from the key managing means.

The mode of operation of the data processing device of the second aspect of the invention is as follows. The authenticating means issues a first request to the key managing means. Then, the key managing means provides held fixed key data to the authenticating means when the fixed key data is corresponded to the first request. The authenticating means performs authentication with the device based on the key data received from the authenticating means. The key managing means outputs individual data unique to the device received from the device to the key generating means corresponding to the second request when the individual key data is corresponded to the first request. The key generating means generates individual key data based on the individual data in accordance with the second request and provides this to the key managing means. The key managing means provides the individual key data received from the key generating means to the authenticating means. The authenticating means performs the authentication with the device based on the key data received from the key managing means.

According to a third aspect of the invention, there is provided a data processing method comprising a first step of generating individual key data based on individual data unique to a device received from a device and a second step of communicating with the device based on the individual key data generated in the first step to perform the authentication.

According to a fourth aspect of the invention, there is provided a program to be executed by a data processor, comprising a first routine for generating individual key data unique to a device based on individual data unique to the device received from a device and a second routine for communicating with the device based on the individual key data generated by the first routine to perform authentication.

According to a fifth aspect of the invention, there is provided a secure application module comprising: a key generating circuit for generating individual key data unique to corresponding devices to be authenticated based on individual data unique to each device and an authenticating circuit for performing authentication with a corresponding device based on the individual key data generated by the key generating circuit.

BRIEF DESCRIPTION OF THE DRAWINGS

The above object and features of the present invention will be more apparent from the following description of the preferred embodiments given with reference to the accompanying drawings, wherein.

DESCRIPTION OF THE PREFERRED EMBODIMENTS

Figure 1:
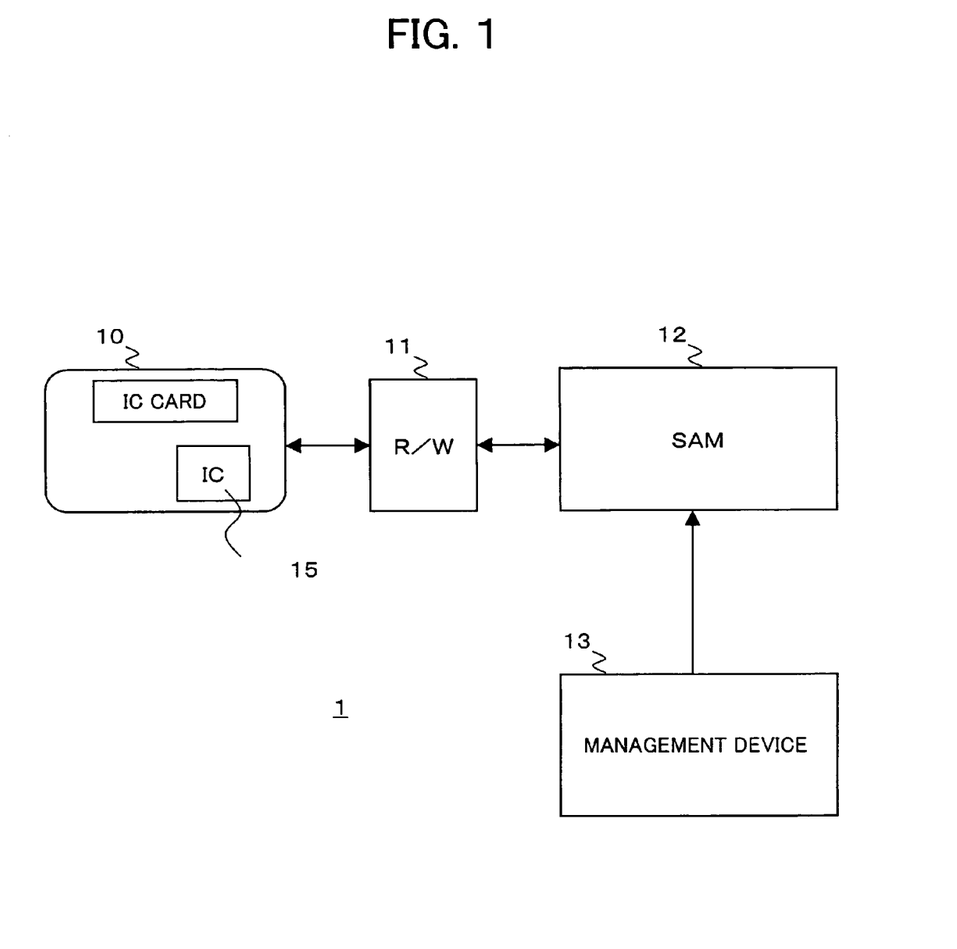
FIG. 1 is a view of the configuration of a card system of an embodiment of the present invention.

Below, an explanation will be given of a card system according to an embodiment of the present invention. FIG. 1 is a view of the configuration of a card system 1 of the present embodiment. As shown in FIG. 1, the card system 1 performs processing concerning a predetermined service in linkage after an IC 15 of the IC card 10 and a secure application module (SAM) 12 perform authentication via for example a reader/writer (R/W) 11. Here, the SAM 12 corresponds to the data processor of the present invention, and the IC 15 corresponds to the device of the present invention. The IC stores service data relating to at least one service. The SAM communicates with a semiconductor device such as IC card, portable electronic device which has an IC card function. Further, a management device 13 registers a key package KP storing key data etc. used for mutual authentication between the SAM 12 and the IC 15 into the SAM 12. Further, a manager of the SAM 12, for example, a provider of the predetermined service utilizing the IC card 10, issues the IC card 10 to each of a plurality of users.

The IC 15 stores data concerning various services received by a user of the IC 15 and file data of programs by utilizing the SAM 12 and is set with utilization rights for services using the file data. Concretely, the IC 15 and the SAM 12 perform processing concerned with a service in linkage conditional on the IC 15 and the SAM 12 performing mutual authentication based on the key data corresponding to the designated service and confirm mutual legitimacy. In the present embodiment, the IC card 10 issued to each of the plurality of users is allocated key data (individual key data of the present invention) unique to individual IC cards 10 as part of the key data used for the authentication. Then, the SAM 12 receives as input identification data IDM such as a serial number allocated uniquely to the IC card 10 at the time of production and generates key data used for the authentication by a predetermined algorithm based on this identification data IDM.

Below, an explanation will be given of the components shown in FIG. 1.

[IC 15]

Figure 2:
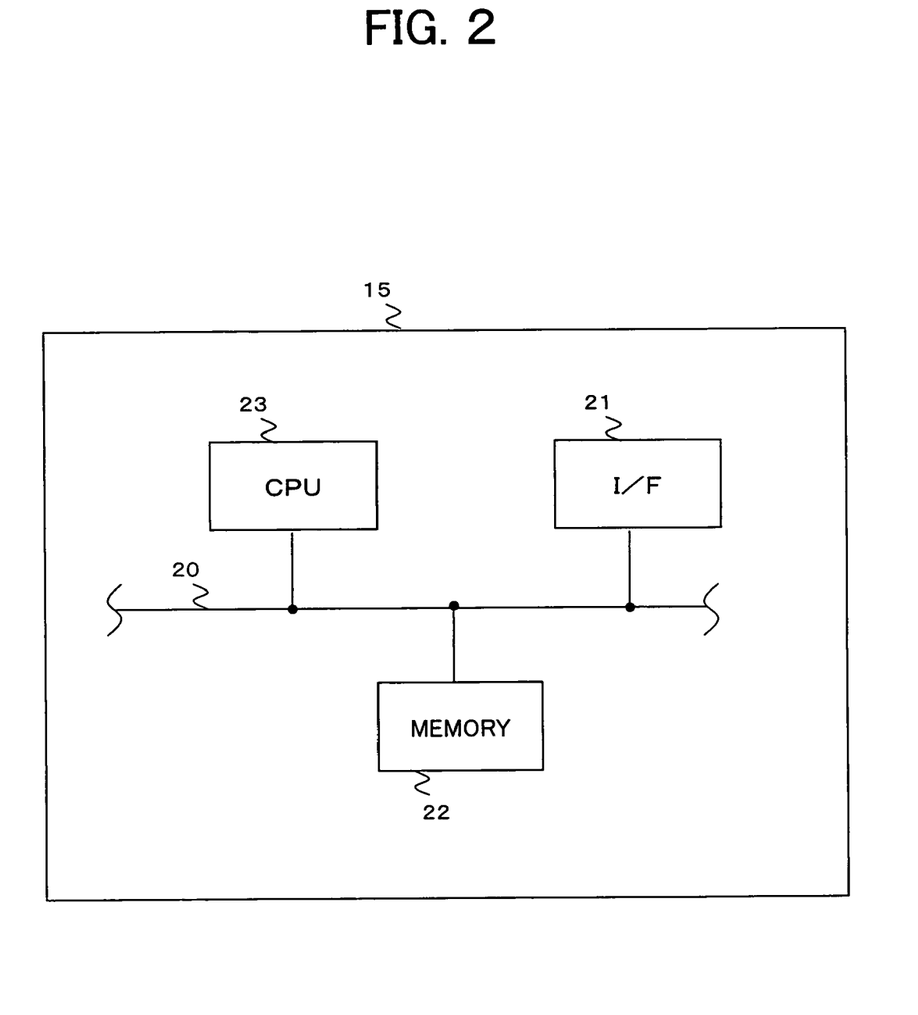
FIG. 2 is a view of the configuration of an IC built in an IC card shown in FIG. 1.

FIG. 2 is a view of the configuration of an IC 15 built into the IC card 10 shown in FIG. 1. As shown in FIG. 2, the IC 15 has for example an interface 21, a memory 22, and a CPU 23 connected via an internal bus 20. The interface 21 transfers data between with the SAM 12 via the R/W 11. The memory 22 stores the data used for processing concerning various services received by the user of the IC 15 and file data of programs by utilizing the SAM 12. Further, the memory 22 stores various key data used for authentication with the SAM 12 before the processing concerning the service. Further, the memory 22 stores the identification data IDM unique to the individual IC card 10.

Note that the SAM 12 performs for example mutual authentication based on the key data corresponding to the system code commonly allocated to the SAM 12 of the same model and authorizes access to the IC 15 conditional on mutual legitimacy being confirmed by the mutual authentication. Further, the memory 22 stores the file data of various services in the area as folders having hierarchical structures. The SAM 12 performs mutual authentication based on the key data corresponding to the area code of the area in the memory 22 and authorizes access to the related area conditional on mutual legitimacy being authenticated by the mutual authentication. Further, the SAM 12 performs the mutual authentication based on the key data corresponding to the service code of the file data stored in the area and authorizes access to the related file data conditional on mutual legitimacy being authenticated by the mutual authentication.

Figure 3:
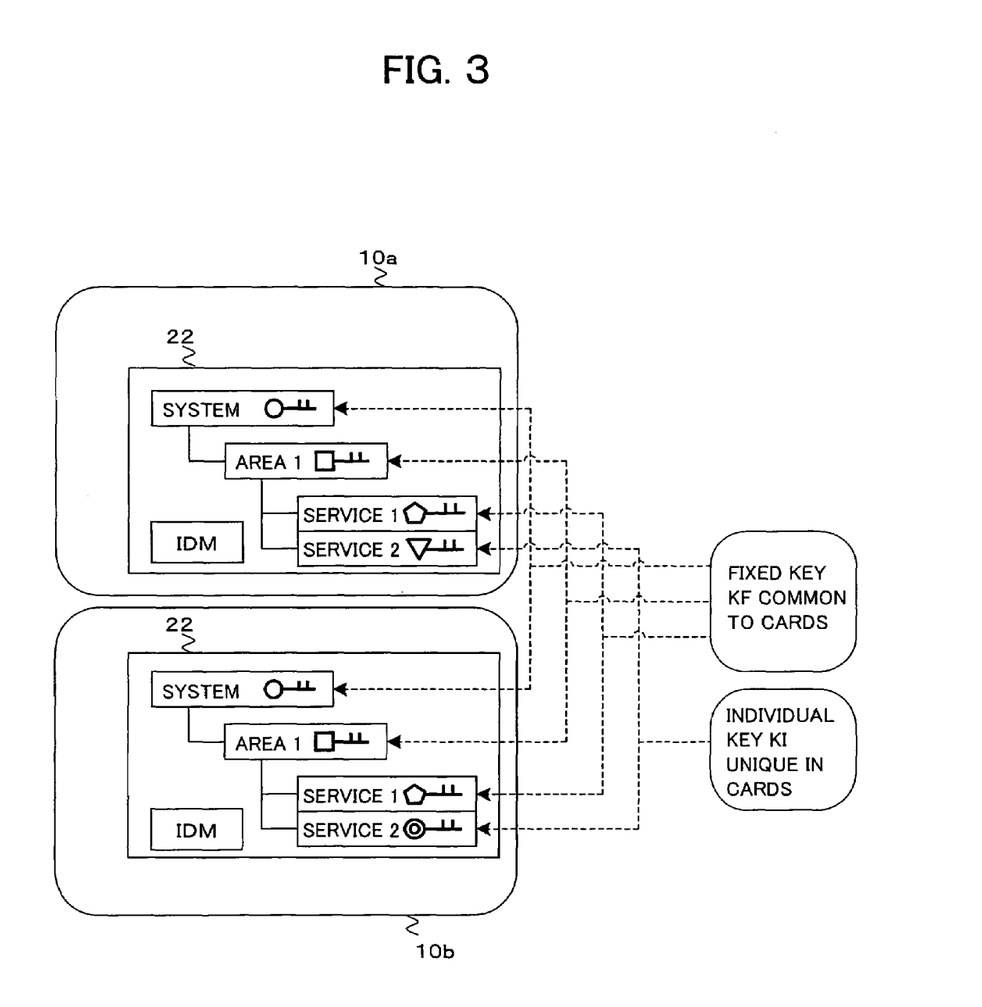
FIG. 3 is a diagram for explaining various key data defined in the IC shown in FIG. 1.

In the present embodiment, as shown in FIG. 3, the fixed key data and the individual key data are defined as the type of the key data defined as mentioned above concerning the IC 15. The fixed key data is for example key data having the same value so far as the location on the file system is the same among the ICs 15 of a plurality of IC cards 10. The individual key data is key data having different values even if the location on the file system is the same among the ICs 15 of a plurality of IC cards 10. Namely, the individual key data is key data unique to the ICs 15 of a plurality of IC cards 10. Note that the IC 15 performs processing without specifying either of the fixed key data or the individual key data as the key data.

The CPU 23 transfers data with the SAM 12 via the interface 21 and the R/W 11 to perform mutual authentication with the SAM 12 based on the program read out from the memory 22 and the key data. Further, when confirming mutual legitimacy by the mutual authentication, the CPU 23 executes the processing concerning the service corresponding to the key data used in the mutual authentication while being corresponded to the SAM 12. Further, the CPU 23 decodes the enciphered key package via the interface 21 in accordance with an operation of the manager whose predetermined right has been authenticated and writes the key data in the decoded key package into the memory 22 at the time of for example the issuance of the IC card 10.

[SAM 12]

Figure 4:
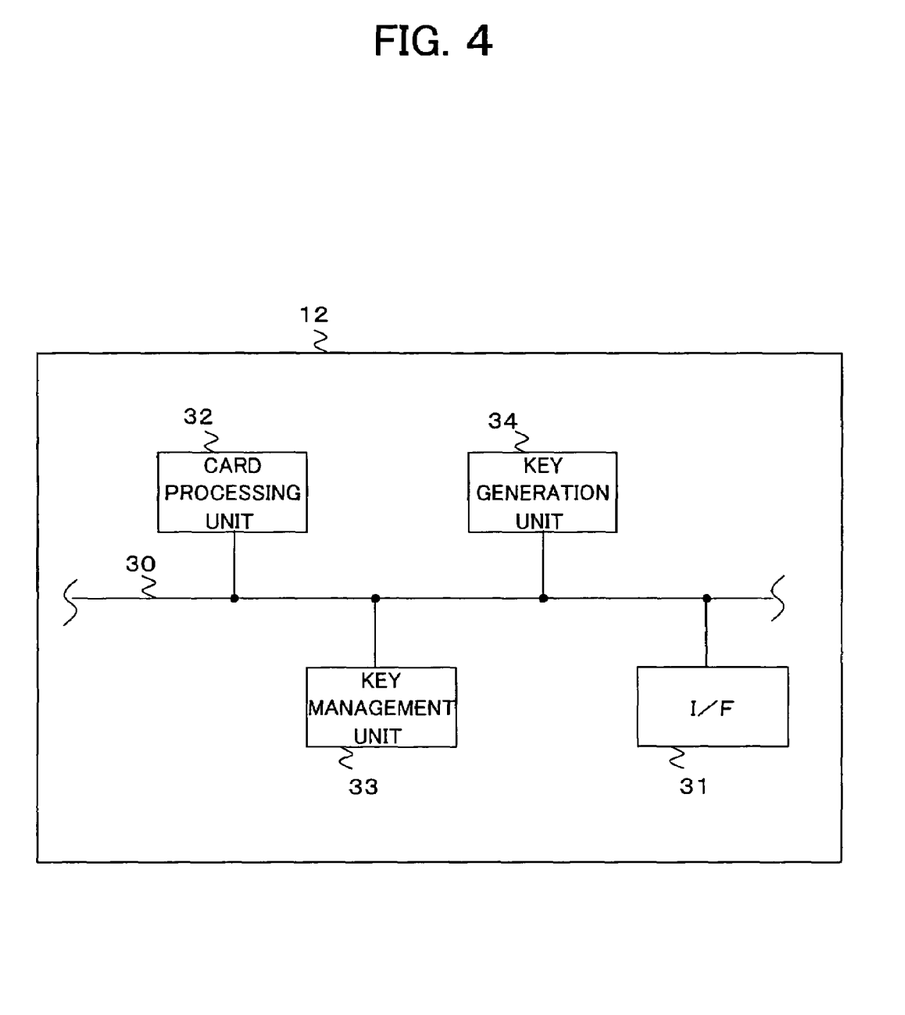
FIG. 4 is a functional block diagram of a SAM shown in FIG. 1.

FIG. 4 is a functional block diagram of the SAM 12 shown in FIG. 1. As shown in FIG. 4, the SAM 12 has for example an interface 31, a card processing unit 32, a key management unit 33, and a key generation unit 34 connected via an internal bus 30. Here, the card processing unit 32 corresponds to the authenticating means of the present invention, the key management unit 33 corresponds to the key managing means of the present invention, and the key generation unit 34 corresponds to the key generating means of the present invention. It is also possible to realize all or part of the card processing unit 32, the key management unit 33, and the key generation unit 34 shown in FIG. 4 by hardware such as a circuit or realize them by executing a program (program of the present invention) by the CPU (data processor of the present invention). At least one of the interface 31, the card processing unit 32, the key management unit 33, and the key generation unit 34 may be realized by a circuit.

The interface 31 transfers data transfer with the IC 15 via the R/W 11 shown in FIG. 1. The card processing unit 32 performs the mutual authentication with the IC 15 of the IC card 10 via the interface 31 based on the key data input from the key management unit 33 and, when confirming the mutual legitimacy by the mutual authentication, performs processing concerning the designated service while being corresponded to the IC 15. The card processing unit 32 realizes various functions by executing application programs. The card processing unit 32 performs the mutual authentication with the IC 15 based on the key data input from the key management unit 33.

Figure 5:
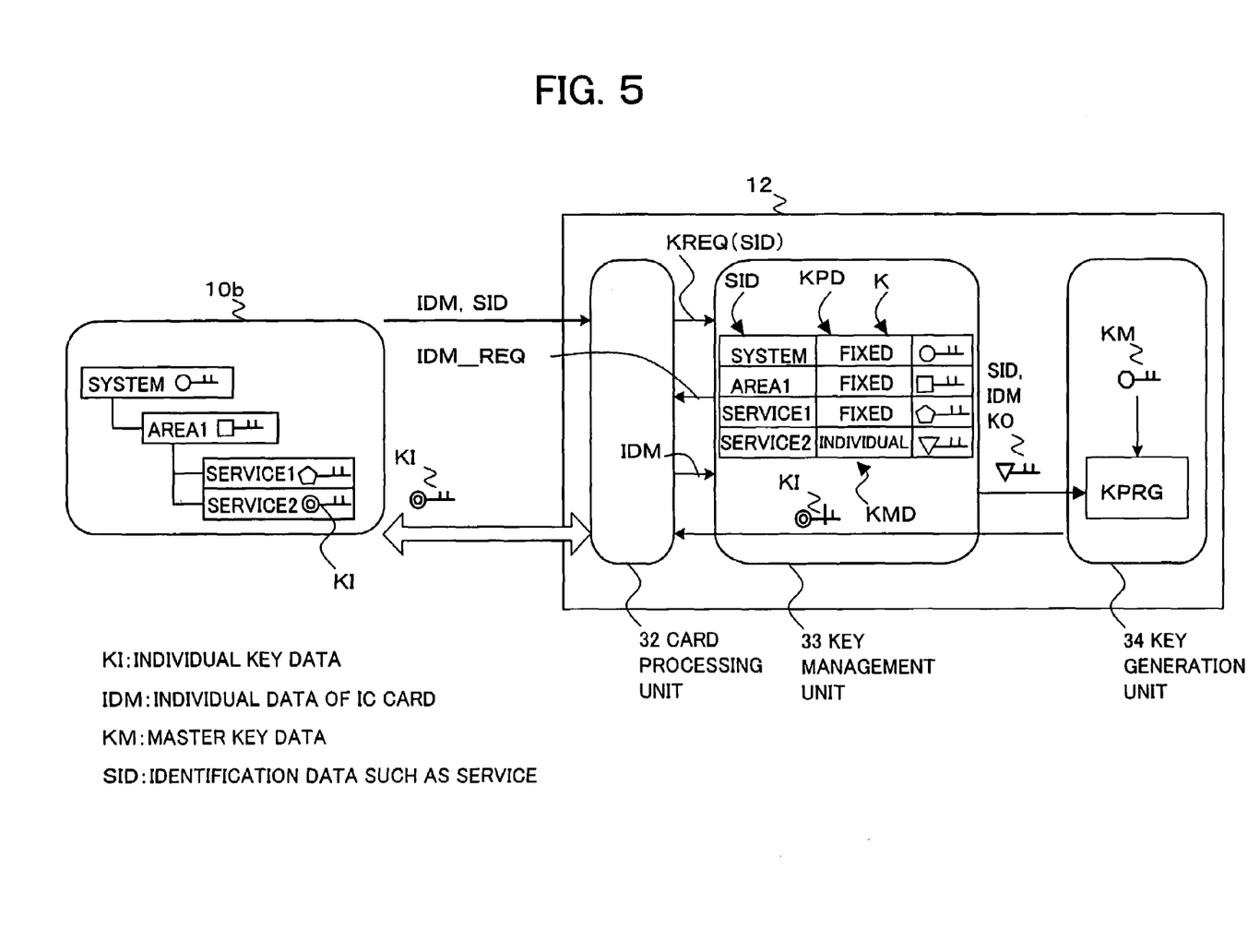
FIG. 5 is a view for explaining the processing of the SAM shown in FIG. 4.

The key management unit 33 holds key management data KMD for managing the key data used for the mutual authentication etc. The key management data KMD indicates the identification data SID, the key data K, and the key property data KPD linked together as shown in FIG. 5. The identification data SID is the data for identifying the service (file data) to be performed by the SAM 12 while being corresponded to the IC 15 and the storage area (folder) etc. for accessing the IC 15 along with the service. The identification data SID is for example the system code input from the IC 15, the area code, or the service code. The key data K is key data used for the mutual authentication with the IC 15 performed preceding the service. The key property data. KPD is data indicating which of the fixed key data or the individual key data is the key data K.

The key management unit 33 reads out the key data (fixed key data) K corresponding to the identification data SID from the key management data KMD and outputs it to the card processing unit 32 where the identification data SID in the key request KREQ from the card processing unit 32 is corresponded to the fixed key data based on the key property data KPD of the key management data KMD. On the other hand, the key management unit 33 requests the identification data IDM (request IDM_REQ in FIG. 5) from the card processing unit 32 where the identification data SID in the key request KREQ from the card processing unit 32 is corresponded to the individual key data based on the key property data KPD of the key management data KMD and outputs the identification data IDM input in accordance with that, the identification data SID, and the key data K (key data KO in FIG. 5) corresponding to the identification data SID extracted from the key management data KMD to the key generation unit 34.

Figure 6:
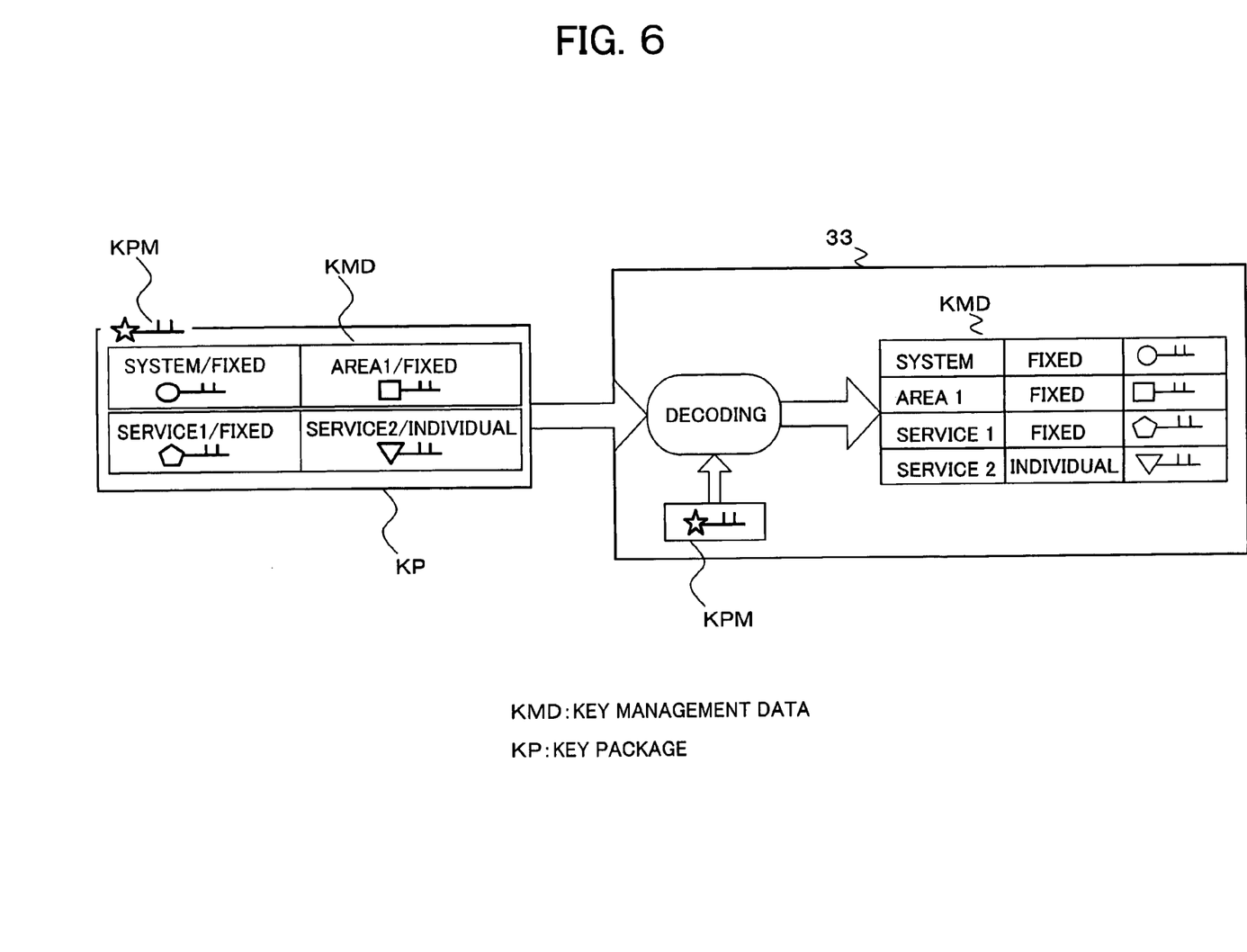
FIG. 6 is a view for explaining registration of key management data in the SAM shown in FIG. 5.

The key management data KM is set in the key management unit 33 for example as follows. Namely, the management device 13 shown in FIG. 1 generates the key package data KP obtained by enciphering the key management data KMD by setting use master key data KPM and outputs this to the SAM 12 as shown in FIG. 6. The SAM 12 decodes the key package data KP input via the interface 31 by using the setting use master key data KPM at the key management unit 33 shown in FIG. 4 or a not illustrated decoding unit and holds this. Here, by a business setting the key management data KMD in the key management unit 33 for providing the service using the SAM 12, the business can manage keys in a secure state and with a high degree of freedom. Note that the key data KO serving as the source of generation of the individual keys stored in the key management data KMD is not the individual key data KI itself. Therefore, even if the secrecy of the key management data KMD is lost, the secrecy of the individual key data KI per se is not lost.

Figure 7:
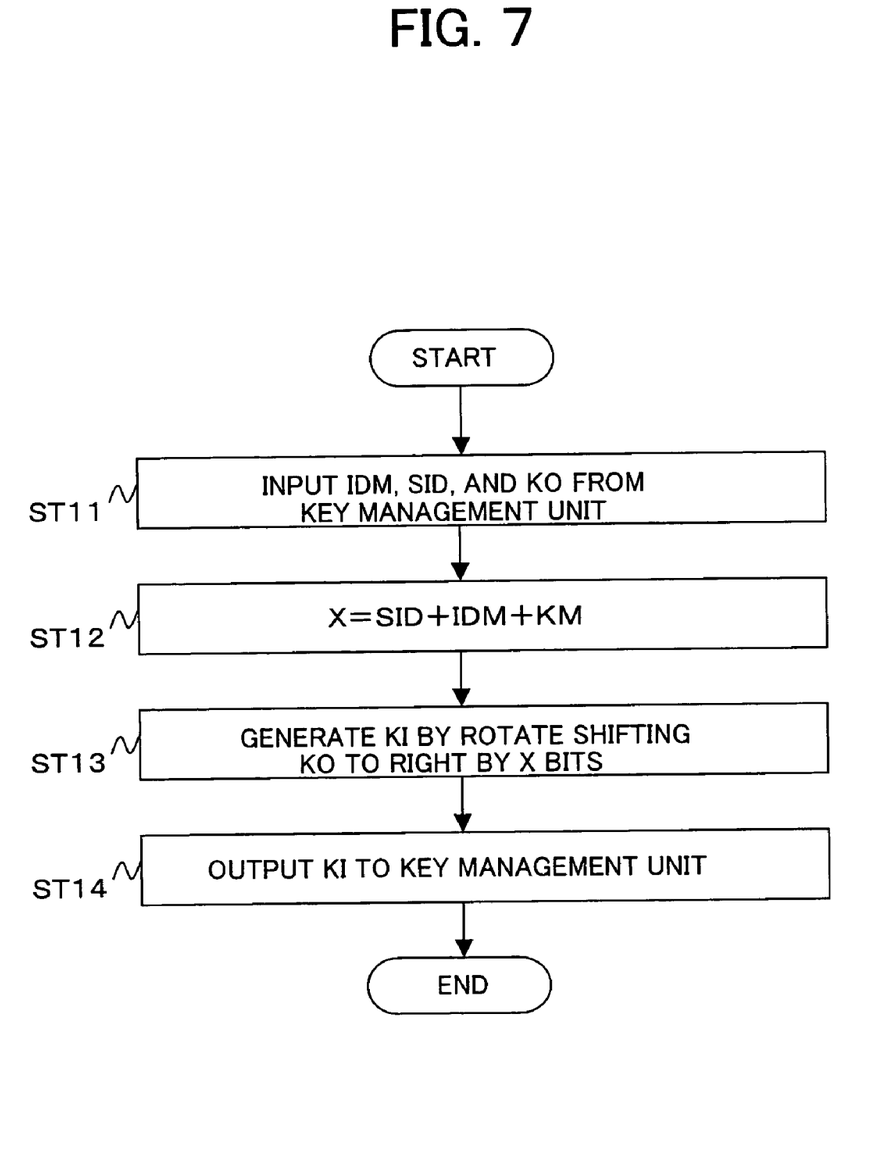
FIG. 7 is a flow chart for explaining a routine for generation of individual key data in a key generation unit shown in FIG. 5.

The key generation unit 34 executes the individual key generation program KPRG based on the master key data KM, the identification data IDM input from the key management unit 33, the identification data SID, and the key data K (KO), generates the key data (individual key data) KI, and outputs this to the key management unit 33. The key management unit 33 outputs the key data KI input from the key generation unit 34 to the card processing unit 32. The key generation unit 34 generates the key data KI by the routines shown in FIG. 7. The routines shown in FIG. 7 are described in the individual key generation program KPRG. Below, the steps shown in FIG. 7 will be explained.

Step ST11:
The key generation unit 34 receives as input the identification data IDM, the identification data SID, and the key data K (KO) from the key management unit 33.

Step ST12:
The key generation unit 34 adds the identification data SID, the identification data IDM, and the master key data KM to generate the data X.

Step ST13:
The key generation unit 34 rotate-shifts the right of the key data K (KO) by exactly the amount of the value of the data X to generate the individual key data KI.

Step ST14:
The key generation unit 34 outputs the individual key data KI generated at step ST13 to the key management unit 33.

Note that it is also possible for the key generation unit 34 to prepare programs of different algorithms for example for every processing content with the IC 15, for example, for every location of the processing target on the file system, for example for every area code, as the individual key generation program KPRG used for the generation of the key data KI, select the program corresponding to the designated identification data SID, and execute the program. Further, it is also possible for the key generation unit 34 to generate the individual key data KI without using the master key data KM. Further, the generation routines of the individual key data shown in FIG. 7 are one example. The present invention is not limited to this.

In this way, by the key generation unit 34 generating the individual key data by using the identification data IDM, the identification data SID, and the key data K (KO) other than the master key data KM, it can impart a role equivalent to the master key data to the data relating to key generation. For this reason, the settings concerning the key data used for the authentication by a business etc. having the right concerning the setting of the key management data KMD can be freely changed. Further, as mentioned above, by generating the individual key data based on the different algorithms by the individual key generation program KPRG based on the location etc. on the file system, the security can be raised more. Namely, even if the logic for part of the area service is leaked, the security of the other area service can be kept.

Below, an example of the operation of the card system 1 shown in FIG. 1 will be explained.

First Example of Operation

Figure 8:
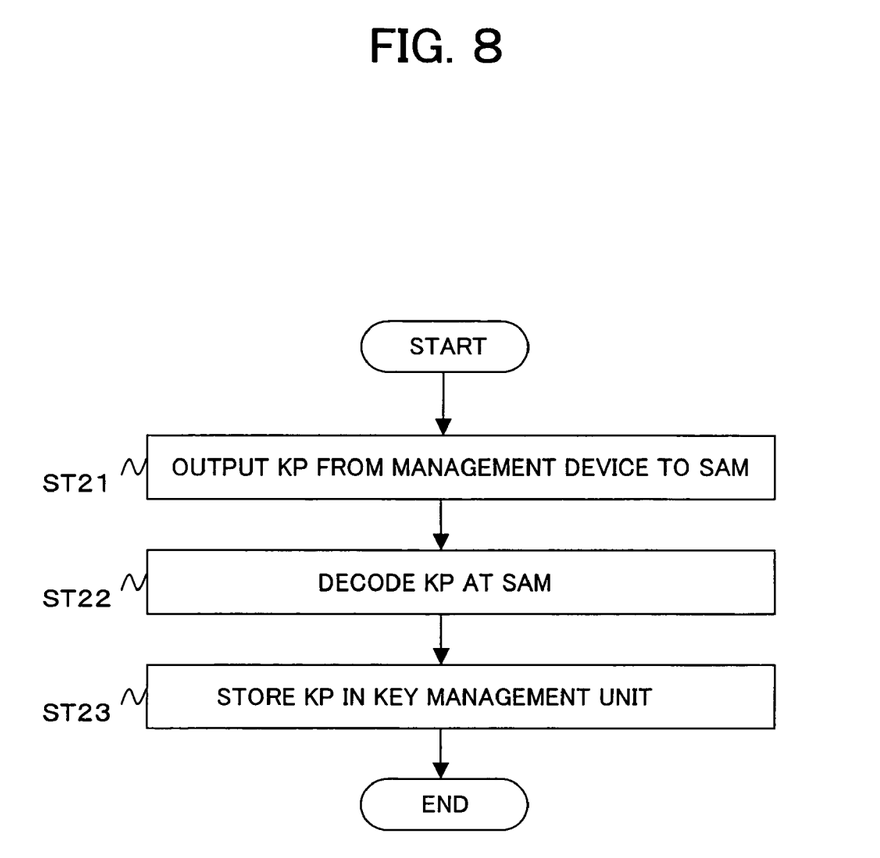
FIG. 8 is a flow chart for explaining a routine for registration of key management data in the SAM shown in FIG. 5.

In the related example of operation, a case where the key management data KMD was set in the SAM 12 will be explained. FIG. 8 is a flow chart for explaining this example of operation.

Step ST21:
The management device 13 shown in FIG. 1 generates the key package data KP obtained by enciphering the key management data KMD by the setting use master key data KPM and outputs this to the SAM 12 as shown in FIG. 6.

Step ST22:
The SAM 12 decodes the key package data KP input via the interface 31 by using the setting use master key data KPM at the key management unit 33 shown in FIG. 4 or a not illustrated decoding unit to generate the key management data KMD.

Step ST23:

The key management unit 33 holds the key management data KMD generated at step ST22.

Second Example of Operation

Figure 9:
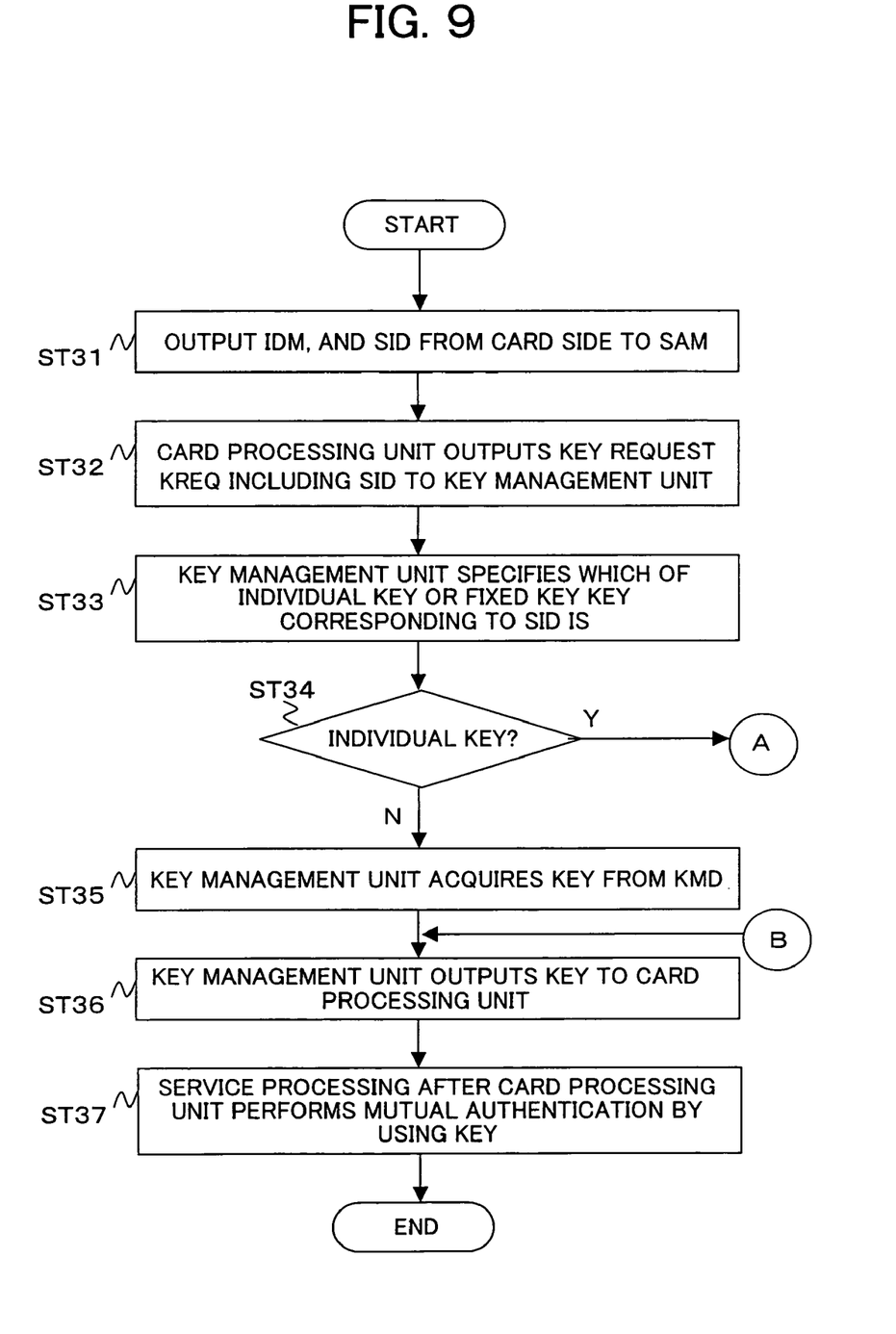
FIG. 9 is a flow chart for explaining an example of an operation when performing processing concerning a service between the IC of the IC card shown in FIG. 5 and the SAM.
Figure 10:
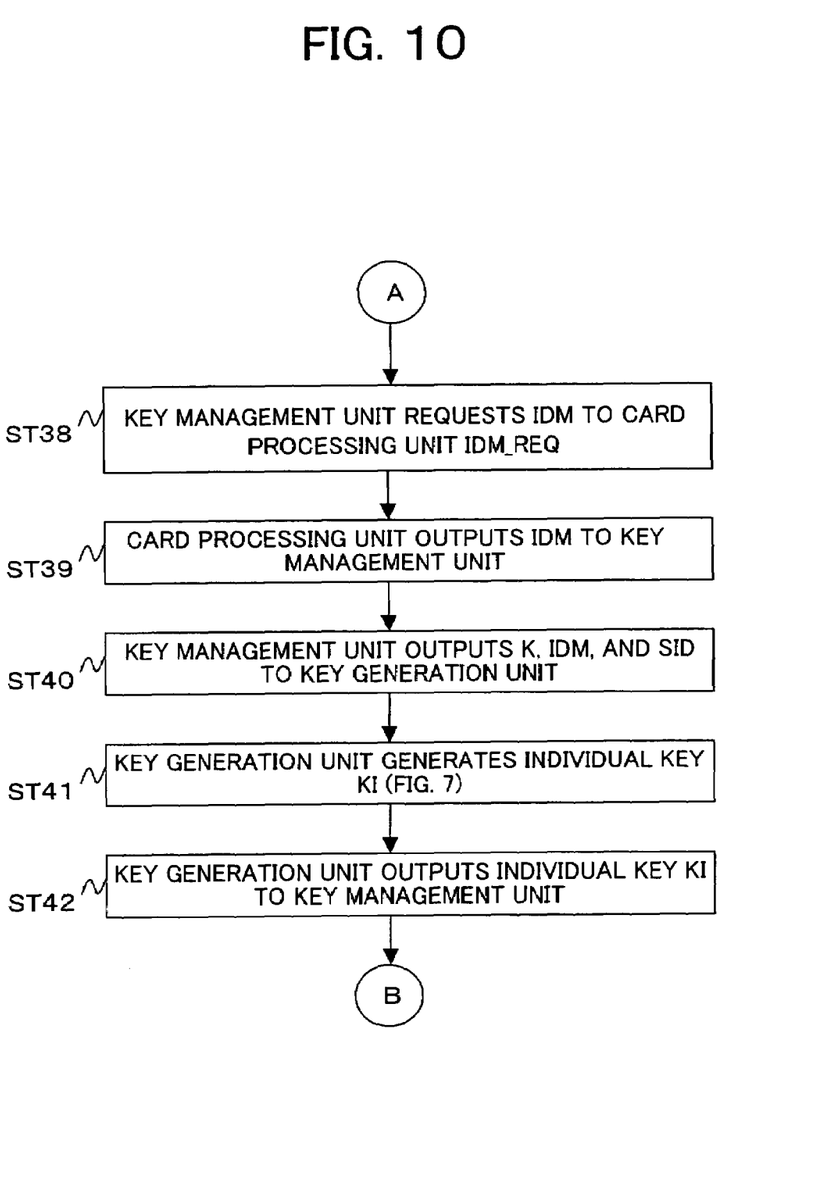
FIG. 10 is a flow chart continuing from FIG. 9 for explaining an example of an operation when performing processing concerning a service between the IC of the IC card shown in FIG. 5 and the SAM.

In this example of operation, the example of operation in a case where processing concerning a service is carried out between the IC 15 of an IC card 10b and the SAM 12 will be explained based on FIG. 5. FIG. 9 and FIG. 10 are flow charts for explaining this example of operation.

Step ST31:

The user loads the IC card 10 in the R/W 11 shown in FIG. 1 and designates the service it desires by using for example the operation unit provided in the R/W 11. Note that, it is also possible if the IC 15 or the SAM 12 automatically designates the service. Due to this, the identification data SID of the designated service is output from the IC 15 to the SAM 12, and the identification data IDM read out from the memory 22 of the IC 15 is output to the SAM 12.

Step ST32:

The card processing unit 32 outputs the key request KREQ including the identification data SID input at step ST31 to the key management unit 33.

Step ST33:

The key management unit 33 specifies which of the individual key or the fixed key the key data K corresponding to the identification data SID included in the key request KREQ input at step ST22 is.

Step ST34:

When the key management unit 33 specifies the fixed key at step ST33, the operation routine proceeds to step ST33, and while when it specifies the individual key, the operation routine proceeds to step ST38.

Step ST35:

The key management unit 33 acquires the key data (fixed key data) corresponding to the identification data SID input at step ST32 by referring to the key management data KMD.

Step ST36:

The key management unit 33 outputs the key data obtained at step ST35 or the key data input from the key generation unit 34 at step ST42 mentioned later to the card processing unit 32.

Step ST37:

The card processing unit 32 performs the mutual authentication with the IC 15 based on the key data input at step ST36 and, when it confirms the mutual legitimacy, performs the service processing corresponding to the identification data SID input at step ST31 while being corresponded to the IC 15.

Step ST38:

The key management unit 33 outputs a request IDM_REQ for requesting identification data IDM to the card processing unit 32 when the key is identified as an individual key at step ST34.

Step ST39:

The card processing unit 32 outputs the identification data IDM input from the IC 15 at step ST31 to the key management unit 33 in accordance with the request IDM_REQ input at step ST38.

Step ST40:

The key management unit 33 reads out the key data KO corresponding to the identification data SID from the key management data KMD. Then, the key management unit 33 outputs the key data KO, the identification data IDM input at step ST39, and the identification data SID input at step ST32 to the key generation unit 34.

Step ST41:

The key generation unit 34 generates the individual key data KI by using the key data etc. input at step ST33 by the routines explained by using FIG. 7.

Step ST42:

The key generation unit 34 outputs the individual key data KI input at step ST41 to the key management unit 33.

The operation of the card system 1 explained based on FIG. 9 and FIG. 10 is applied to for example a ticket issuance service defined corresponding to the individual key data. When the user operates the R/W 11 to designate the ticket issuance service, the identification data SID corresponding to the ticket issuance service is output to the SAM 12. At the SAM 12, the identification data SID of the ticket issuance service is corresponded to for example the key property data KPD indicating the individual key in the key management data KMD, so the key management unit 33 makes the key generation unit 34 generate the individual key data KI. Then, the card processing unit 32 performs the mutual authentication with the IC 15 based on the generated individual key data KI. Then, the card processing unit 32 enciphers the ticket issuance data by using the fixed key data in the key management data KMD according to need when confirming the legitimacy of the IC 15 by the mutual authentication and outputs the same to the IC 15.

As explained above, at the card system 1, before the processing of the service between the SAM 12 and the IC 15, the SAM 12 generates individual key data KI unique to the IC 15 based on the identification data IDM unique to the IC card 10 (IC 15) received from the IC 15 and performs the mutual authentication with the IC 15 based on the individual key data KI. For this reason, even if the secrecy of the individual key data KI of part of the IC cards 10 among the plurality of IC cards 10 is lost, the secrecy of the individual key data of the other IC cards 10 is not lost and the security can be raised.

Further, according to the card system 1, the identification data SID for identifying the service etc. is output from the IC 15 to the SAM 12 and the algorithm of the individual key generation is switched based on the identification data SID at the SAM 12, so the secrecy of the individual key data based on other algorithms can be kept when the secrecy of one algorithm is lost.

Further, according to the card system 1, the identification data SID for identifying the service etc. is output from the IC 15 to the SAM 12 and it is decided at the SAM 12 based on the identification data SID which of the individual key or the fixed key the key data used for the authentication is. Therefore, the IC 15 can perform the processing without being aware of which of the individual key or the fixed key the key data used for the authentication is.

Further, according to the card system 1, the key management unit 33 switches the processing corresponding to the individual key or the fixed key. Therefore, the card processing unit 32 can perform the processing without specifying which of the individual key or the fixed key the key data to be used for the authentication is. For this reason, the load accompanying development of a card processing unit 32 can be reduced and, at the same time, the leakage of information concerning authentication using individual keys to the developers of the card processing unit 32 can be prevented.

Further, according to the card system 1, in the key specifying data KPD of the key management data KMD, by determining the property of the key data as fixed key for all key data, compatibility with a system using only fixed keys can be achieved.

Further, according to the card system 1, independent from the operation of the card processing unit 32, the processing concerned with the individual key data is carried out based on the key management data KMD at the key management unit 33. Therefore, the information concerning the individual key data can be prevented from being divulged to the developer of the application program of the card processing unit 32. Namely, the information concerning the individual key data can be limited to only a setter/developer of the key management data KMD and the individual key generation program KPRG, and a high security can be realized.

According to the card system 1, by generating the individual key data based on the identification data IDM as mentioned above, the SAM 12 does not have to store the individual key data of all IC cards 10, so can be configured by using a small scale memory.

Figure 11:
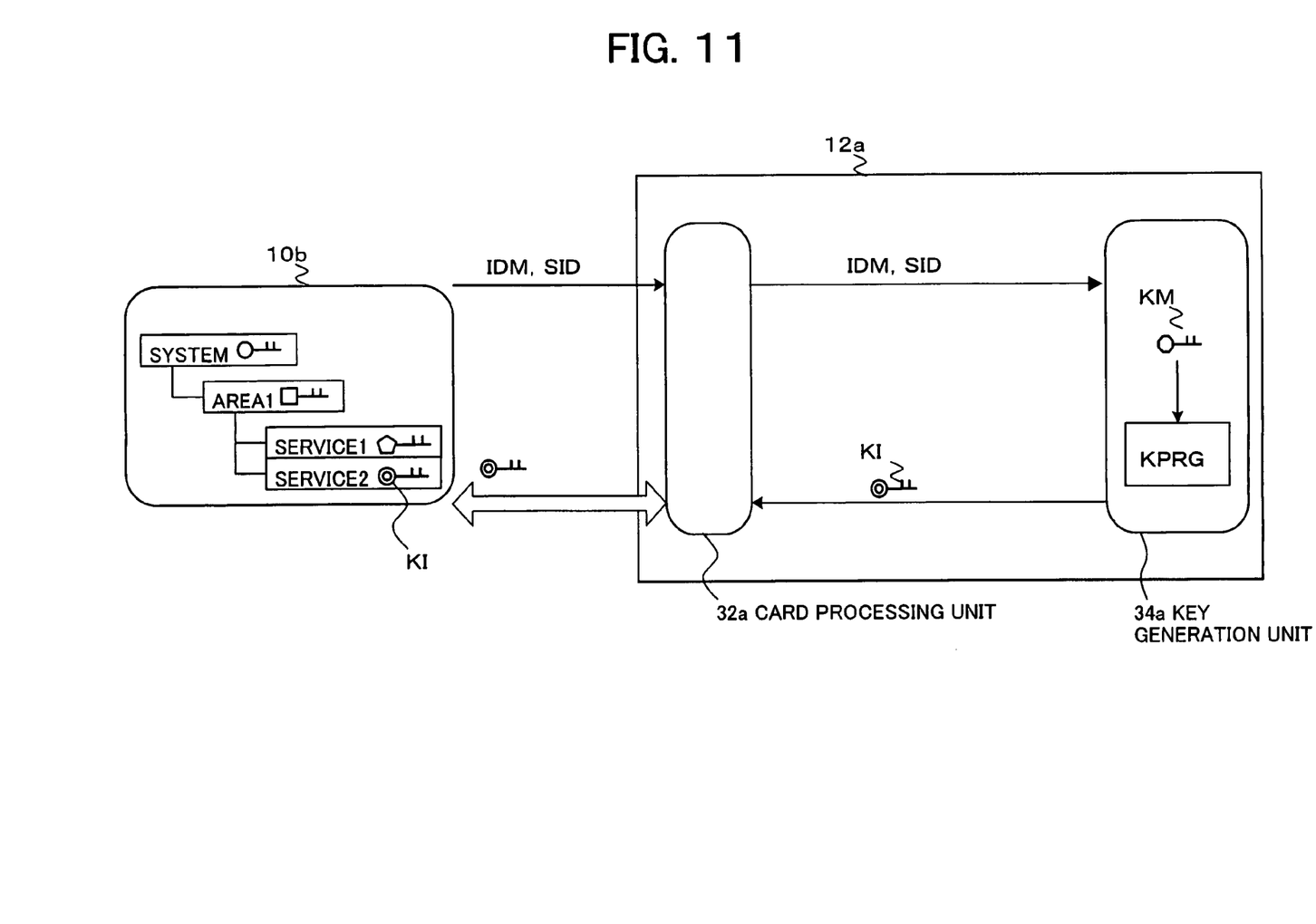
FIG. 11 is a view for explaining a modification of the SAM of the card system of the present invention.

The present invention is not limited to the above embodiment. For example, in the present invention, it is also possible to configure a SAM 12a not by using the key management unit 33, but by using a card processing unit 32a and a key generation unit 34a. In this case, the card processing unit 32a receives as input the identification data IDM and SID from the IC 15 of the IC card 10b and outputs them to the key generation unit 34a. The key generation unit 34a generates the individual key data KI by using the identification data IDM and SID input from the card processing unit 32a and outputs them to the card processing unit 32a. Then, the card processing unit 32a performs the mutual authentication with the IC 15 based on the individual key data KI input from the key generation unit 34a.

Further, in the above embodiment, the IC 15 of the IC card 10 was illustrated as the device of the present invention, but the device may be a computer etc. too.

According to the present invention, a data processing device, in a system performing authentication among a plurality of device to be authenticated, able to keep the security of the authentication at other devices even in a case where the secrecy of the key data held by part of the devices is lost and a method and program of the same can be provided.

While the invention has been described with reference to specific embodiments chosen for purpose of illustration, it should be apparent that numerous modifications could be made thereto by those skilled in the art without departing from the basic concept and scope of the invention.

What is claimed is:

1. A data processing device comprising:
    an interface configured to receive device identification data, service identification data and key data from a device;
    a processor configured to determine that the service identification data corresponds to one of an individual key unique to the device and a fixed key common to a plurality of devices; and
    a key module configured to generate the individual key by adding the device identification data, the service identification data, and master key data to generate a key parameter, and shift the key data by an amount of the key parameter to generate the individual key when it is determined that the service identification data corresponds to an individual key, and retrieve the fixed key from memory when it is determined that the service identification data corresponds to a fixed key,
    wherein mutual authentication is performed between the data processing device and the device using at least one of the generated individual key and the retrieved fixed key based on the determination, and the processor is authorized to access the file data corresponding to the service identification data when the data processing device and the device are mutually authenticated.

2. The data processing device of claim 1, further comprising:
    a memory configured to store the fixed key common to the plurality of devices; and
    a processor configured to perform first authentication using said fixed key and second authentication using said individual key.

3. The data processing device of claim 1, further comprising:
    a processor configured to authenticate existence of rights relating to processing corresponding to file data held by the device based on the individual key.

4. The data processing device of claim 3, wherein said device stores said file data in a folder having a predetermined hierarchical structure, and a processor authenticates the existence of rights to access at least one of said folder and said file data of the device based on said individual key.

5. A data processing method comprising:
    receiving device identification data, service identification data, and key data from a device;
    determining that the service identification data corresponds to one of an individual key unique to the device and a fixed key common to a plurality of devices;
    generating the individual key by adding the device authentication data, the service identification data, and master key data to generate a key parameter, and shifting the key data by an amount of the key parameter to generate the individual key when it is determined that the service identification data corresponds to an individual key;
    retrieving the fixed key from memory when it is determined that the service identification data corresponds to a fixed key;
    performing mutual authentication between a data processing device and the device using at least one of the generated individual key and the retrieved fixed key based on the determination; and
    accessing the file data corresponding to the service identification data when the data processing device and the device are mutually authenticated.

6. A computer readable recording medium including computer program instructions, which cause a processor to execute a method of information processing, comprising:
    receiving device identification data, service identification data, and key data from a device;
    determining that the service identification data corresponds to one of an individual key unique to the device and a fixed key common to a plurality of devices;
    generating the individual key by adding the device authentication data, the service identification data, and master key data to generate a key parameter, and shifting the key data by an amount of the key parameter to generate the individual key when it is determined that the service identification data corresponds to an individual key;
    retrieving the fixed key from memory when it is determined that the service identification data corresponds to a fixed key;
    performing mutual authentication between the processor and the device using at least one of the generated individual key and the retrieved fixed key based on the determination; and
    accessing the file data corresponding to the service identification data when the processor and the device are mutually authenticated.

* * * * *